(12) United States Patent
Yi

(10) Patent No.: US 9,845,077 B2
(45) Date of Patent: Dec. 19, 2017

(54) FLAT WIPER BLADE AND COUPLING METHOD

(71) Applicant: KBWS CORPORATION, Daegu (KR)

(72) Inventor: Tak Min Yi, Daegu (KR)

(73) Assignee: KBWS Corporation, Daegu (KR)

(*) Notice: Subject to any disclaimer, the term of this patent is extended or adjusted under 35 U.S.C. 154(b) by 617 days.

(21) Appl. No.: 14/330,549

(22) Filed: Jul. 14, 2014

(65) Prior Publication Data
US 2015/0158463 A1    Jun. 11, 2015

(30) Foreign Application Priority Data

Dec. 5, 2013    (KR) ........................ 10-2013-0150308

(51) Int. Cl.
*B60S 1/38*    (2006.01)
*B60S 1/34*    (2006.01)

(52) U.S. Cl.
CPC .............. *B60S 1/3875* (2013.01); *B60S 1/34* (2013.01); *B60S 1/3851* (2013.01); *B60S 1/3879* (2013.01); *B60S 1/3808* (2013.01); *B60S 1/3848* (2013.01); *B60S 2001/3812* (2013.01); *B60S 2001/3817* (2013.01); *B60S 2001/3822* (2013.01); *B60S 2001/3841* (2013.01); *Y10T 29/49826* (2015.01)

(58) Field of Classification Search
CPC .... B60S 1/3875; B60S 1/3851; B60S 1/3831; B60S 1/3879; B60S 1/3881
USPC ........... 15/250.32, 250.43, 250.201, 250.361
See application file for complete search history.

(56) References Cited

U.S. PATENT DOCUMENTS

| 2,782,447 | A | * | 2/1957 | Anderson | B60S 1/3801 15/250.453 |
| 3,626,544 | A | * | 12/1971 | Lopez | B60S 1/38 15/250.361 |
| 3,885,265 | A | * | 5/1975 | Deibel | B60S 1/3801 15/250.452 |
| 3,919,736 | A | * | 11/1975 | Bourassa | B60S 1/3801 15/250.452 |
| 4,009,503 | A | * | 3/1977 | Sharp | B60S 1/3801 15/250.454 |
| 4,360,943 | A | * | 11/1982 | Thompson | B60S 1/38 15/250.454 |

(Continued)

FOREIGN PATENT DOCUMENTS

| DE | 10034790 A1 | 2/2002 |
| JP | 2001-504779 A | 4/2001 |

(Continued)

OTHER PUBLICATIONS

Office Action for Japanese Patent Application No. JP 2014-178978, dated Oct. 27, 2015, 4 Pages. (With Concise Explanation of Relevance).

(Continued)

*Primary Examiner* — Michael Jennings
(74) *Attorney, Agent, or Firm* — Fenwick & West LLP

(57) ABSTRACT

Disclosed is a flat wiper blade that includes: a wiper strip 10 which wipes a wiping surface; at least one guide clip 20 which passes through and is fitted to the wiper strip 10 in a width direction of the wiper strip 10; and a guide spring 30 which is coupled to the wiper strip 10 and the guide clip 20 and supports the wiper strip 10.

13 Claims, 10 Drawing Sheets

(56) References Cited

U.S. PATENT DOCUMENTS

| | | | | |
|---|---|---|---|---|
| 4,389,747 A | * | 6/1983 | Riester | B60S 1/3801 15/250.454 |
| 4,442,566 A | * | 4/1984 | Sharp | B60S 1/38 15/250.454 |
| 4,501,043 A | * | 2/1985 | Plisky | B60S 1/3801 15/250.454 |
| 4,993,103 A | * | 2/1991 | Takahashi | B60S 1/3801 15/250.454 |
| 5,493,750 A | * | 2/1996 | Bollen | B60S 1/3801 15/250.31 |
| 5,522,113 A | * | 6/1996 | White | B60S 1/38 15/250.01 |
| 5,598,603 A | * | 2/1997 | Mege | B60S 1/3801 15/250.451 |
| 5,933,910 A | * | 8/1999 | Buechele | B60S 1/38 15/250.451 |
| 7,350,259 B2 | * | 4/2008 | Walworth | B60S 1/3856 15/250.201 |
| 7,540,061 B1 | * | 6/2009 | Huang | B60S 1/3881 15/250.201 |
| 7,827,652 B2 | * | 11/2010 | Yang | B60S 1/381 15/250.201 |
| 9,009,910 B2 | * | 4/2015 | Yang | B60S 1/3801 15/250.32 |
| 2001/0008034 A1 | | 7/2001 | Merkel et al. | |
| 2008/0150193 A1 | * | 6/2008 | Walworth | B29C 33/76 264/310 |
| 2012/0297565 A1 | * | 11/2012 | Beelen | B60S 1/3891 15/250.31 |
| 2013/0117957 A1 | * | 5/2013 | Ku | B60S 1/4019 15/250.201 |

FOREIGN PATENT DOCUMENTS

| | | |
|---|---|---|
| JP | 2012-224115 A | 11/2012 |
| KR | 1020080093335 A | 10/2008 |

OTHER PUBLICATIONS

Office Action for German Patent Application No. DE 102014115106.2, Nov. 5, 2015, 5 Pages (With Concise Explanation of Relevance).

* cited by examiner

FLAT WIPER BLADE AND COUPLING METHOD

CROSS-REFERENCE TO RELATED APPLICATION

This application claims the benefit of priority under 35 U.S.C. §119(a) to Korean Patent Application No. 10-2013-0150308 filed on Dec. 6, 2013, which is incorporated by reference herein in its entirety.

FIELD

The present invention relates to a flat wiper blade and a coupling method.

DESCRIPTION OF RELATED ART

In general, a wiper blade removes impurities, snow, rain or the like when driving and prevents a driver's front sight from being deteriorated. As a motor drives a link apparatus connected to a wiper arm, the wiper blade performs a repetitive reciprocating action in a fan shape.

The wiper blade includes a long wiper strip in contact with a glass surface and a guide spring which maintains and supports the wiper strip in a longitudinal direction of the wiper strip. The wiper blade including the guide spring is known as a "conventional" wiper blade in the art. Recently, a wiper blade is being employed which makes use of one guide spring curved at a predetermined curvature and formed in the form of a long thin bar. Such a wiper blade is known as a flat wiper blade or a flat-bar wiper blade in the art.

As compared with the "conventional" wiper blade, the flat wiper blade has a less height and receives less air resistance. With a uniform load, the flat wiper blade is also able to cause the wiper strip to contact with the glass surface. A flat wiper blade assembly including the flat wiper blade includes an adaptor disposed in the central portion of the guide spring. The flat wiper blade assembly is connected to a wiper arm such that the adaptor is separably connected to the end portion of the wiper arm.

Among the existing flat wiper blades, there is a flat wiper blade in which the guide spring and the wiper strip are connected to each other by using a yoke. The flat wiper blade using the yoke has the problems that the number of parts becomes larger, and the guide spring is separated from a spoiler, and the overall height of the flat wiper blade increases.

Therefore, there is a need to research a flat wiper blade that couples a spoiler integrated wiper strip and the guide spring without using the yoke, thereby minimizing the number of the parts required for manufacturing the flat wiper blade and reducing the overall height of the flat wiper blade.

SUMMARY

One embodiment is a flat wiper blade that includes: a wiper strip 10 which wipes a wiping surface; at least one guide clip 20 which passes through and is fitted to the wiper strip 10 in a width direction of the wiper strip 10; and a guide spring 30 which is coupled to the wiper strip 10 and the guide clip 20 and supports the wiper strip 10.

The wiper strip 10 may include a base 11 and a wiping lip 12 which is disposed under the base 11. The base 11 may include receiving recesses 14 which are formed on both sides of a width direction central portion of the base 11 and extend parallel to each other in the longitudinal direction of the base 11. The guide spring 30 may be fitted to the receiving recess 14.

The wiper strip 10 may include at least one guide clip hole 15 which is formed to pass through the receiving recess 14 in the width direction of the wiper strip 10. The guide clip 20 may pass through and be fitted to the guide clip hole 15.

A spoiler may be integrally formed with the wiper strip 10 on both longitudinal ends of the wiper strip 10.

The flat wiper blade may further include a fixing guide clip 21 or a fastening guide clip 22. The fixing guide clip 21 or the fastening guide clip 22 may pass through and be fitted to the guide clip hole 15. The guide spring 30 may include a guide clip coupling recess 36 to which the fixing guide clip 21 or the fastening guide clip 22 is coupled.

The fixing guide clip 21 or the fastening guide clip 22 may include at least one pair of guide spring coupling protrusions 26 formed at both ends thereof. The guide spring coupling protrusion 26 may be caught by the guide clip coupling recess 36.

The guide spring coupling protrusion 26 may be elastically caught by the guide clip coupling recess 36.

The guide clip 20 may include guide spring coupling holes 24 which are formed at both sides of a central portion of the guide clip 20 in the width direction of the wiper strip 10 in a state where the guide clip 20 has been coupled to the wiper strip 10 and which extend parallel to each other in the longitudinal direction of the wiper strip 10. The guide spring 30 may pass through and be fitted to the guide spring coupling hole 24 of the guide clip 20.

The guide clip 20 may further include a catching portion 29 of which the end is caught by a catching surface 19 of the wiper strip 10.

The fixing guide clip 21 or the fastening guide clip 22 may further include a catching portion 29 of which the end is caught by a catching surface 19 of the wiper strip 10.

The guide spring 30 may include a first guide spring 31 and a second guide spring 32.

An upper surface 15a of the guide clip hole 15 may be located higher than an upper surface 14a of the receiving recess 14 and may be located lower than a top surface 11a of the spoiler. A lower surface 15b of the guide clip hole 15 may be located higher than a lower surface 11b of the base 11. A height direction gap of the guide clip hole 15 may be larger than that of the receiving recess 14 and may be smaller than the height of the base 11.

The flat wiper blade may further include a seating part 100 which is coupled to the wiper strip 10 in an attachable and removable manner. The guide spring 30 may be coupled to the seating part 100.

The seating part 100 may include an inner surface 150 and at least one bridge 138 which connects both sides of a bottom surface of the seating part 100 through the central portion thereof. The wiper strip 10 may further include at least one seating part bridge receiving recess 18 which is formed on a top surface of a longitudinal central portion of the wiper strip 10. The bridge 138 may be inserted into the seating part bridge receiving recess 18. The guide spring 30 may be fitted by passing through between the inner surface 150 of the seating part 100 and a top surface of the bridge 138.

Another embodiment is a method for coupling a wiper strip 10, a guide clip 20, a guide spring 30 and a seating part 100 of a flat wiper blade. The method includes: a step in which the at least one guide clip 20 passes through and is fitted to a guide clip hole 15 of the wiper strip 10; a step in which the guide spring 30 is coupled to the wiper strip 10 and the guide clip 20; and a step in which the seating part 100 is coupled to the wiper strip 10 or the guide spring 30 under a state where the wiper strip 10, the guide clip 20 and the guide spring 30 have been coupled to each other.

Further another embodiment is a method for coupling a wiper strip 10, a guide clip 20, a guide spring 30 and a seating part 100 of a flat wiper blade. The method includes: a step in which the at least one guide clip 20 passes through and is fitted to a guide clip hole 15 of the wiper strip 10; a step in which the seating part 100 is coupled to the wiper strip 10; and a step in which the guide spring 30 is coupled to the wiper strip 10, the guide clip 20 and the seating part 100 under a state where the wiper strip 10, the guide clip 20 and the seating part 100 have been coupled to each other.

Yet another embodiment is a method for coupling a wiper strip 10, a guide clip 20, a guide spring 30 and a seating part 100 of a flat wiper blade. The method includes: a step in which the seating part 100 is coupled to the wiper strip 10; a step in which the at least one guide clip 20 passes through and is fitted to a guide clip hole 15 of the wiper strip 10; and a step in which the guide spring 30 is coupled to the wiper strip 10, the guide clip 20 and the seating part 100 under a state where the wiper strip 10, the guide clip 20 and the seating part 100 have been coupled to each other.

The method may further include: a step in which at least one fixing guide clip 21 or at least one fastening guide clip 22 passes through and is fitted to the guide clip hole 15 of the wiper strip 10; and a step in which a guide spring coupling protrusion 26 of either the fixing guide clip 21 or the fastening guide clip 22 is caught by a guide clip coupling recess 36 of the guide spring 30.

The step in which the at least one guide clip 20 passes through and is fitted to a guide clip hole 15 of the wiper strip 10 may include a step in which an end of a catching portion 29 of the guide clip 20 is caught by a catching surface 19 of the wiper strip 10.

The step in which the seating part 100 is coupled to the wiper strip 10 may include a step in which a bridge 138 of the seating part 100 is inserted into a seating part bridge receiving recess 18 of the wiper strip 10.

DETAILED DESCRIPTION

An embodiment of the present invention will be described in detail with reference to the accompanying drawings. In the components of the present invention, detailed descriptions of what can be clearly understood and easily carried into practice through a prior art by those skilled in the art will be omitted to avoid making the subject matter of the present invention unclear.

Embodiment

Hereafter, first, the overall structure of a flat wiper blade assembly 1 will be described.

Figure 1:
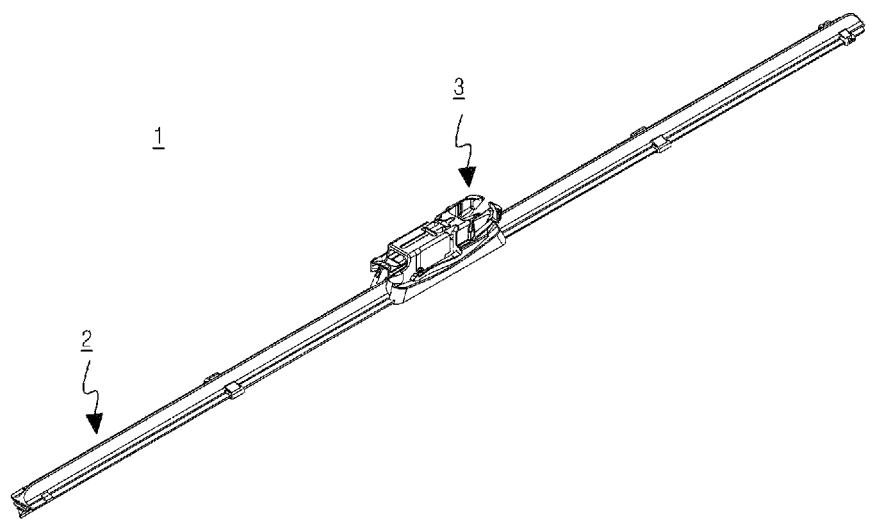
FIG. 1 is a perspective view showing an overall configuration of a flat wiper blade assembly.
Figure 2:
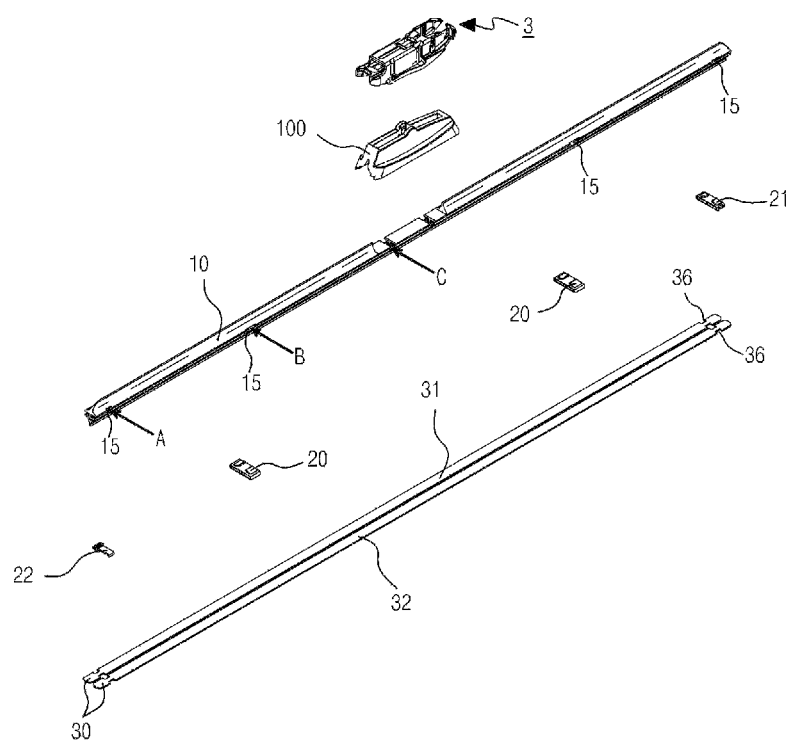
FIG. 2 is an exploded perspective view showing that the flat wiper blade assembly of FIG. 1 has been disassembled.

FIG. 1 is a perspective view showing an overall configuration of the flat wiper blade assembly. FIG. 2 is an exploded perspective view showing that the flat wiper blade assembly of FIG. 1 has been disassembled.

As shown in FIG. 1, the flat wiper blade assembly 1 according to the present invention includes a flat wiper blade 2 contacting closely with the glass surface of a vehicle and includes an adaptor 3 assembled to the central portion of the flat wiper blade 2 so as to connect the flat wiper blade 2 to a wiper arm (not shown).

Hereafter, the flat wiper blade 2 will be described.

As shown in FIGS. 1 and 2, the flat wiper blade 2 includes a wiper strip 10 which wipes a glass surface of a vehicle with a close contact with the glass surface of the vehicle and on which a spoiler is integrally formed on both longitudinal ends of the wiper strip, at least one guide clip 20 which passes through and is fitted to the wiper strip 10 in a width direction of the wiper strip 10, a guide spring 30 which is disposed on both sides of the wiper strip 10 and supports the wiper strip 10, and a seating part 100 for coupling the adaptor 3 to both the wiper strip 10 and the guide spring 30.

Here, although the foregoing has described that the separate adaptor 3 which is distinguished from the seating part 100 is included, the present invention is not necessarily limited to this. The seating part 100 may be integrally formed with the adaptor 3. That is, the seating part 100 may include the adaptor 3.

The flat wiper blade 2 is connected to the front end of the wiper arm and receives a pressing force from the wiper arm with respect to the glass surface of the vehicle. The wiper arm rotates reciprocatively at a predetermined angle by a wiper motor (not shown). Accordingly, the flat wiper blade 2 wipes the glass surface (wiping surface) of the vehicle within the predetermined angle.

Hereafter, the wiper strip 10 will be described.

Figure 3:
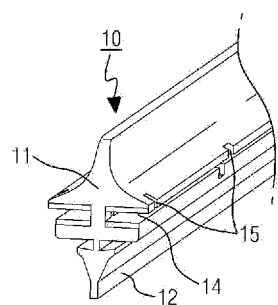
FIG. 3 is a perspective view showing one end of a wiper strip of FIG. 2.
Figure 4:
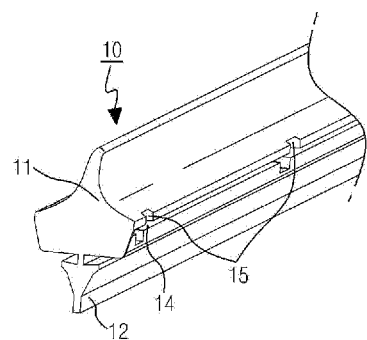
FIG. 4 is a perspective view showing the other end of the wiper strip of FIG. 2.
Figure 5:
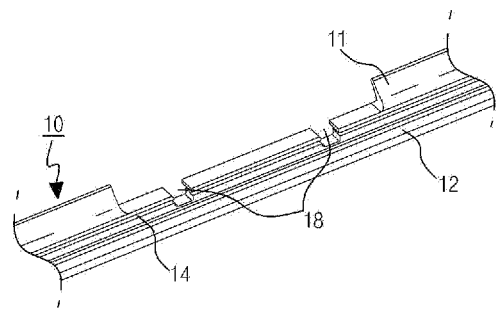
FIG. 5 is a perspective view showing the central portion of the wiper strip of FIG. 2.
Figure 6A:
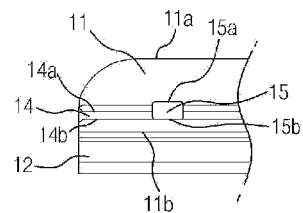
FIG. 6a is an enlarged side view of the wiper strip of FIG. 2 as viewed from the position "A"
Figure 6B:
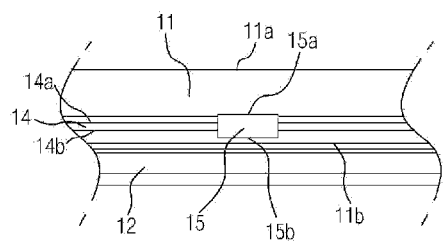
FIG. 6b is an enlarged side view of the wiper strip of FIG. 2 as viewed from the position "B"
Figure 6C:
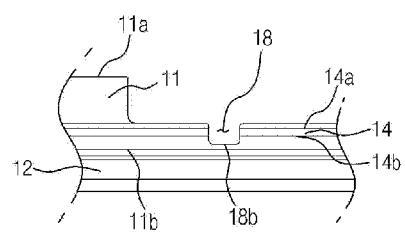
FIG. 6c is an enlarged side view of the wiper strip of FIG. 2 as viewed from the position "C"

FIG. 3 is a perspective view showing one end of a wiper strip of FIG. 2. FIG. 4 is a perspective view showing the other end of the wiper strip of FIG. 2. FIG. 5 is a perspective view showing the central portion of the wiper strip of FIG. 2. FIG. 6a is an enlarged side view of the wiper strip of FIG. 2 as viewed from the position "A". FIG. 6b is an enlarged side view of the wiper strip of FIG. 2 as viewed from the position "B". FIG. 6c is an enlarged side view of the wiper strip of FIG. 2 as viewed from the position "C".

As shown in FIGS. 3 to 6, the wipers strip 10 includes a base 11 and a wiping lip 12 which is disposed under the base 11 and contacts directly with and wipes the glass surface. The wiper strip 10 as a whole has a long thin shape in the major axial direction of the flat wiper blade 2 and is made of an elastic material like a rubber material or made of an elastic composite material. The wiper strip 10 is disposed to contact with the glass of the vehicle in a sliding manner and removes impurities of the glass surface.

Referring to FIGS. 1 to 5, the wiper strip 10 is supported by the guide spring 30 disposed on both sides of the base 11. The base 11 and the wiping lip 12 continuously extend in the longitudinal direction of the wiper strip 10.

Referring to FIGS. 3 to 6, receiving recesses 14 in which the guide spring 30 is received in a sliding manner are formed on both sides of the width direction central portion of the base 11 and extend parallel to each other in the longitudinal direction thereof. Here, while the receiving recess 14 at one end of the wiper strip 10 may be open (see FIG. 3), the receiving recess 14 at the other end of the wiper strip 10 may be closed to limit the movement of the guide spring 30 (see FIG. 4).

Referring to FIGS. 2 to 6, on both longitudinal ends of the wiper strip 10, the spoiler may be integrally formed with the base 11 of the wiper strip 10. However, the flat wiper blade 2 of the present invention does not necessarily include the spoiler, and the spoiler is not necessarily formed integrally with the base 11 of the wiper strip 10. Therefore, the flat wiper blade 2 of the present invention may not include the spoiler or a separately formed spoiler may be coupled on the wiper strip 10 by publicly known arts.

Meanwhile, when the spoiler is integrally formed on both longitudinal ends of the wiper strip 10, there is no need to manufacture a separate part of the spoiler which is coupled to the wiper strip 10, the manufacturing process of the flat wiper blade 2 becomes simpler and manufacturing cost is reduced. Also, the overall height of the flat wiper blade 2 can be reduced.

Referring back to FIGS. 2, 3, 4, 6a and 6b, the wiper strip 10 may include at least one guide clip hole 15 which is formed to pass through the receiving recess 14 in the width direction of the wiper strip 10 and allows a below-described guide clip 20 to be fitted thereto. Here, an upper surface 15a of the guide clip hole 15 may be located higher than an upper surface 14a of the receiving recess 14 and may be located lower than the top surface 11a of the spoiler formed on the base 11. A lower surface 15b of the guide clip hole 15 may be located lower than or on the same level as a lower surface 14b of the receiving recess 14 and may be located higher than a lower surface 11b of the base 11.

Therefore, a height direction gap of the guide clip hole 15 may be larger than that of the receiving recess 14 and may be smaller than the height of the base 11.

Referring to FIGS. 5 and 6c, in the base 11 of the wiper strip 10, at least one seating part bridge receiving recess 18 into which a below-described bridge 138 of the seating part 100 is inserted may be formed on the top surface of the longitudinal central portion of the wiper strip 10. Here, a lower surface 18b of the one seating part bridge receiving recess 18 may be located lower than the lower surface 14b of the receiving recess 14.

Hereafter, the guide clip 20 will be described.

Figure 7A:
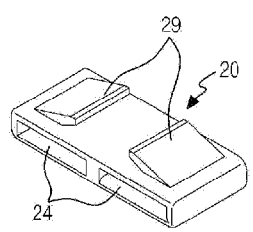
FIG. 7a is a perspective view showing a guide clip of FIG. 2.
Figure 10:
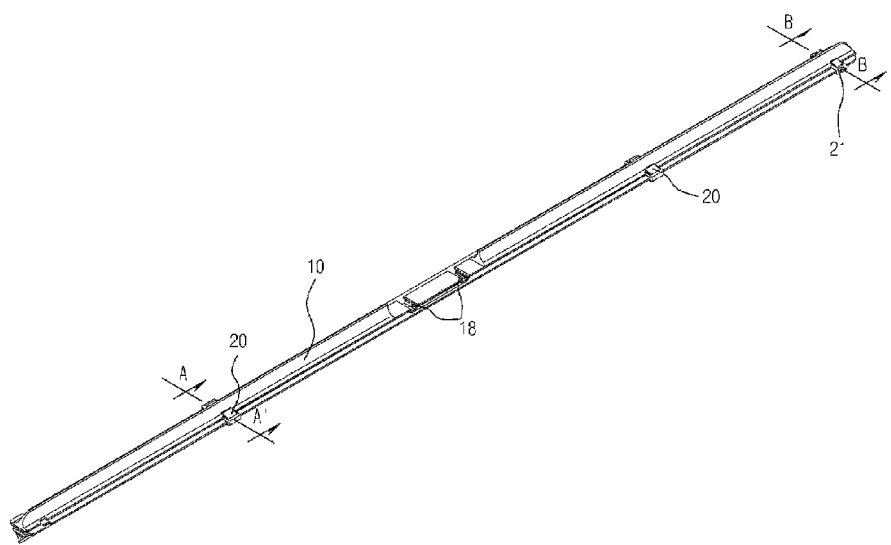
FIG. 10 is a perspective view showing that the wiper strip, the guide clip and the fixing guide clip of FIG. 2 have been coupled to each other.
Figure 11A:
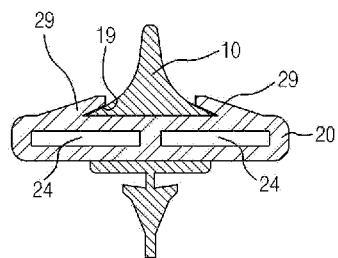
FIG. 11a is a front cross sectional view taken along line A-A' shown in FIG. 10.

FIG. 7a is a perspective view showing the guide clip of FIG. 2. FIG. 10 is a perspective view showing that the wiper strip, the guide clip and the fixing guide clip of FIG. 2 have been coupled to each other. FIG. 11a is a front cross sectional view taken along line A-A' shown in FIG. 10.

The guide clip 20 passes through and is fitted to the guide clip hole 15 of the wiper strip 10. Referring to FIGS. 2, 3, 4, 7a, 10 and 11a, a guide spring coupling hole 24 may be formed in the guide clip 20. The guide spring coupling hole 24 is formed on both sides of the central portion of the guide clip 20 in the width direction of the wiper strip 10 in the state where the guide clip 20 has been fitted to the guide clip hole 15. The guide spring coupling holes 24 extend parallel to each other in the longitudinal direction of the wiper strip 10.

Hereafter, a fixing guide clip 21 and a fastening guide clip 22 will be described.

Figure 7B:
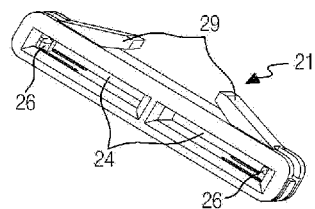
FIG. 7b is a perspective view showing a fixing guide clip of FIG. 2.
Figure 7C:
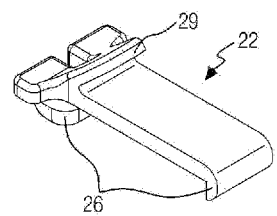
FIG. 7c is a perspective view showing a fastening guide clip of FIG. 2.
Figure 11B:
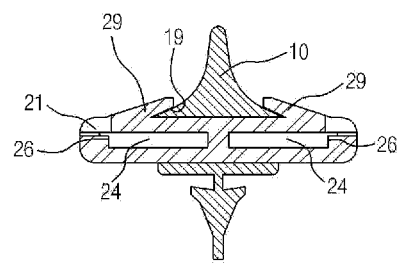
FIG. 11b is a front cross sectional view taken along line B-B' shown in FIG. 10.

FIG. 7b is a perspective view showing the fixing guide clip of FIG. 2. FIG. 7c is a perspective view showing the fastening guide clip of FIG. 2. FIG. 11b is a front cross sectional view taken along line B-B' shown in FIG. 10. FIG.

Figure 17:
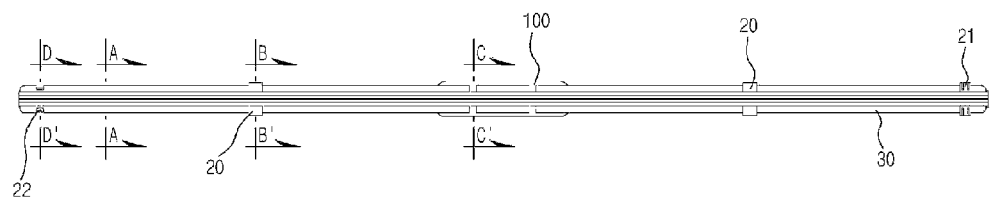
FIG. 17 is a rear view showing a state where the wiper strip, the guide clip, the fixing guide clip, the seating part, the guide spring and the fastening guide clip of FIG. 2 have been coupled to each other.
Figure 18A:
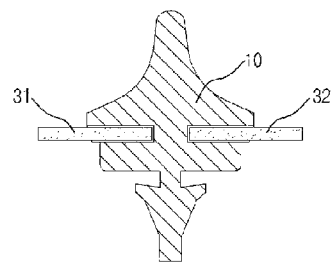
FIG. 18a is a front cross sectional view taken along line A-A' shown in FIG. 17.
Figure 18B:
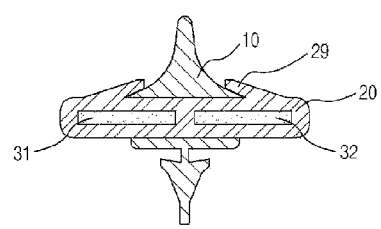
FIG. 18b is a front cross sectional view taken along line B-B' shown in FIG. 17.
Figure 18C:
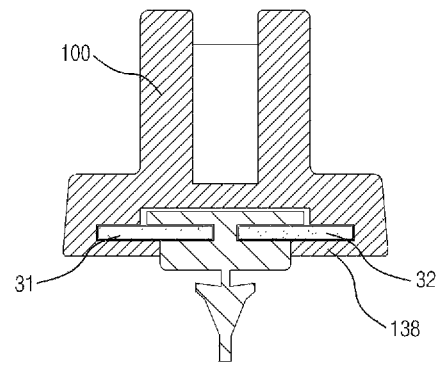
FIG. 18c is a front cross sectional view taken along line C-C' shown in FIG. 17.
Figure 18D:
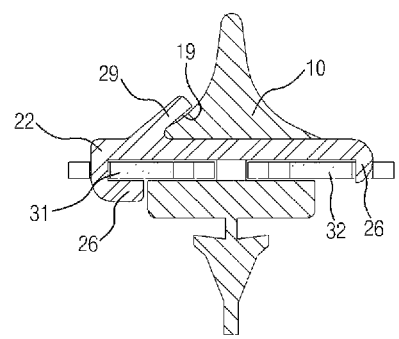
FIG. 18d is a front cross sectional view taken along line D-D' shown in FIG. 17.

17 is a rear view showing a state where the wiper strip, the guide clip, the fixing guide clip, the seating part, the guide spring and the fastening guide clip of FIG. 2 have been coupled to each other. FIG. 18*d* is a front cross sectional view taken along line D-D' shown in FIG. 17.

The fixing guide clip 21 and the fastening guide clip 22 pass through and are fitted to the guide clip hole 15 of the wiper strip 10. Referring to FIGS. 2, 3, 4, 7*b*, 7*c*, 10, 11*b*, 17 and 18*d*, at least one pair of guide spring coupling protrusions 26 which is caught by a below-described guide clip coupling recess 36 of the guide spring 30 may be formed at both ends of the fixing guide clip 21 and the fastening guide clip 22 in the width direction of the wiper strip 10 in the state where the fixing guide clip 21 and the fastening guide clip 22 have been fitted to the guide clip hole 15.

Although the drawings show that the fixing guide clip 21 and the fastening guide clip 22 are fitted respectively to the guide clip hole 15 which is located at one and the other ends of the wiper strip 10, the fixing guide clip 21 and the fastening guide clip 22 may be fitted to any one of a plurality of the guide clip holes 15 irrespective of the location of the guide clip hole 15.

Referring to FIGS. 2, 3, 4, 7, 10, 11, 17 and 18*d*, the guide clip 20, the fixing guide clip 21 and the fastening guide clip 22 may further include a catching portion 29 of which the end is caught by a catching surface 19 of the wiper strip 10 in the state where the guide clip 20 has been fitted to the guide clip hole 15.

Specifically, the catching portion 29 is formed on an upper surface of at least one of both ends located at both sides of the central portion of the guide clip 20 in the width direction of the wiper strip 10 in the state where the guide clip 20 has been fitted to the guide clip hole 15. Then, the end of the catching portion 29 may be caught by the catching surface 19 located on the side of the upper portion of the wiper strip 10.

However, the catching portion may have a structure different from the above-described structure. For example, the catching portion may be formed on the central portion of the upper or lower surface of the guide clip 20, the fixing guide clip 21 or the fastening guide clip 22, and then the catching surface corresponding to this may be formed on the central portion of the upper or lower surface of the guide clip hole 15. Otherwise, the catching portion may be formed at both ends of the upper surface 15*a* or lower surface 15*b* of the guide clip hole 15 in the width direction of the wiper strip 10, and then the catching surface corresponding to this may be formed on the upper or lower surface of the guide clip 20, the fixing guide clip 21 or the fastening guide clip 22.

Hereafter, the seating part 100 will be described.

Figure 8:
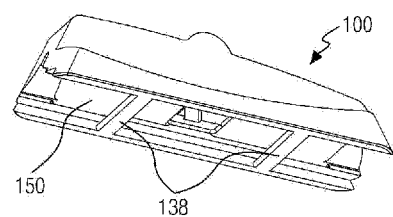
FIG. 8 is a perspective view showing a seating part of FIG. 2.
Figure 12:
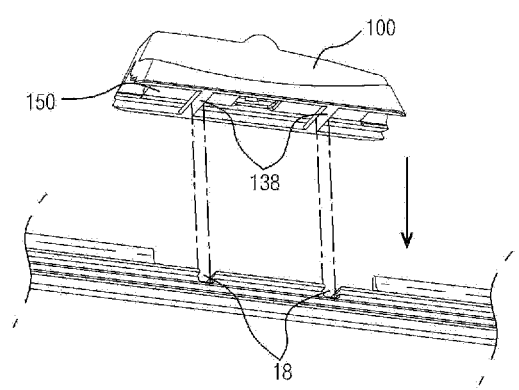
FIG. 12 is a perspective view for describing a coupling process of the wiper strip and the seating part of FIG. 2.

FIG. 8 is a perspective view showing a seating part of FIG. 2. FIG. 12 is a perspective view for describing a coupling process of the wiper strip and the seating part of FIG. 2.

Referring to FIGS. 8 and 12, the seating part 100 has a configuration for connecting the wiper strip 10, the guide spring 30 and the adaptor 3. An inner surface 150 of the seating part 100 comes in contact with the top surface of the longitudinal central portion of the wiper strip 10 and then is coupled to the wiper strip 10. However, the seating part 100 may be configured such that the inner surface 150 of the seating part 100 comes in contact with the top surface of the longitudinal central portion of the guide spring 30, and then is coupled to the guide spring 30.

The seating part 100 may include the at least one bridge 138 which connects both sides of the bottom surface of the seating part 100 through the central portion.

Hereafter, the guide spring 30 will be described.

Figure 9:
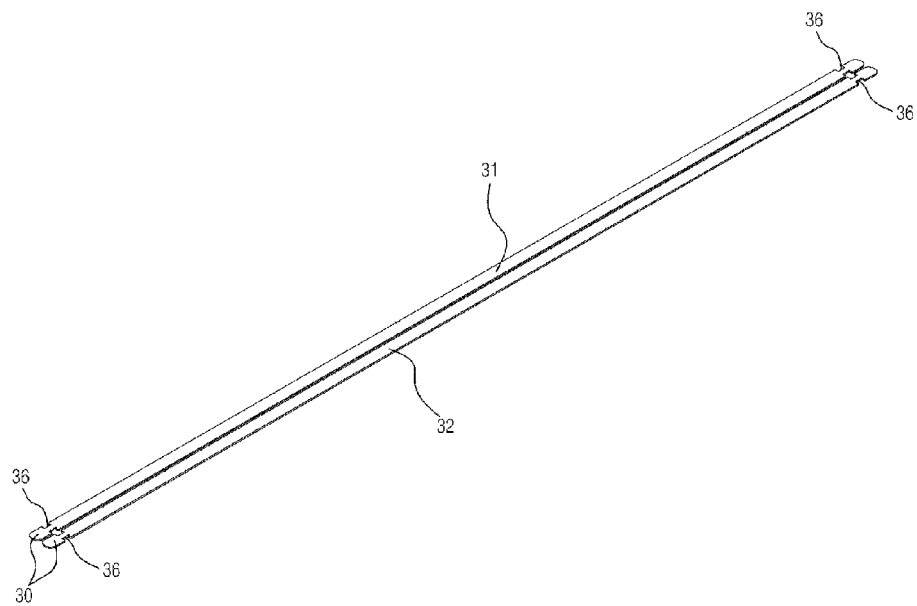
FIG. 9 is a perspective view showing a guide spring of FIG. 2.
Figure 13:
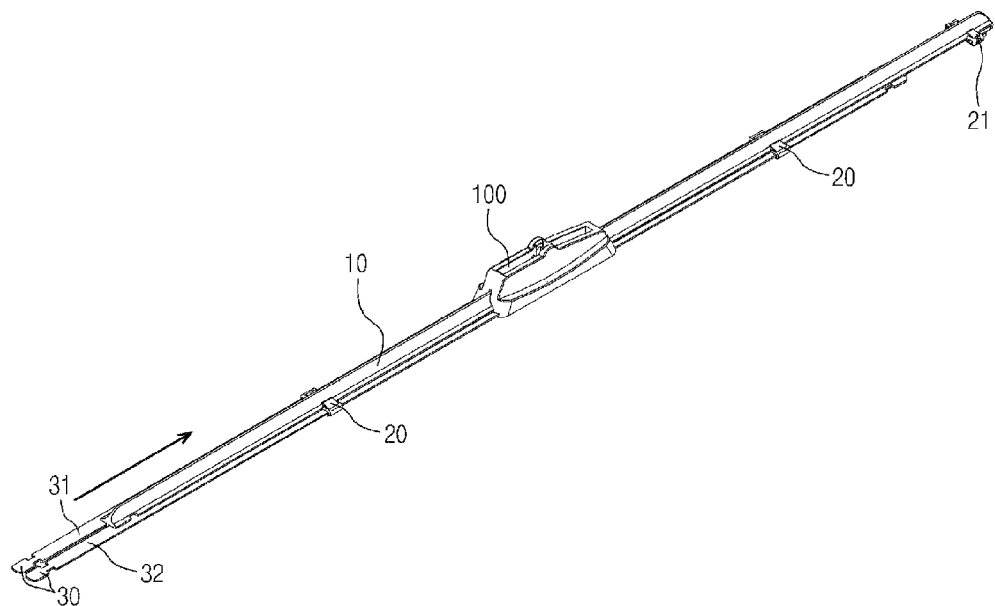
FIG. 13 is a perspective view showing a process in which the guide spring is fitted by passing through a receiving recess of the wiper strip and a guide spring coupling hole of the guide clip and by passing through between an inner surface of the seating part and a top surface of a bridge, under the state where the wiper strip, the guide clip, the fixing guide clip and the seating part of FIG. 2 have been coupled to each other.

FIG. 9 is a perspective view showing a guide spring of FIG. 2. FIG. 13 is a perspective view showing a process in which the guide spring is fitted by passing through a receiving recess of the wiper strip and a guide spring coupling hole of the guide clip and by passing through between an inner surface of the seating part and a top surface of a bridge, under the state where the wiper strip, the guide clip, the fixing guide clip and the seating part of FIG. 2 have been coupled to each other.

Referring to FIG. 9, the guide spring 30 has a long thin shape in the major axial direction of the flat wiper blade 2. The guide spring 30 may be comprised of a first guide spring 31 and a second guide spring 32.

Referring to FIGS. 2, 9 and 13, in outer sides of both ends of the guide spring 30 in the width direction of the wiper strip 10, the guide clip coupling recess 36 which is concave in the width direction of the wiper strip 10 may be formed in a position where the guide spring coupling protrusion 26 of either the fixing guide clip 21 or the fastening guide clip 22 can be inserted.

When a pressing force is applied from the wiper arm, the pressing force is distributed to the wiper strip 10 through the guide spring 30. Here, the pressing force is distributed in the longitudinal direction of the wiper strip 10 by the guide spring 30. Accordingly, the guide spring 30 should have elasticity and rigidity to maintain the shape of the wiper strip 10.

Hereafter, the coupling method for the flat wiper blade 2 will be sequentially described.

Figure 14:
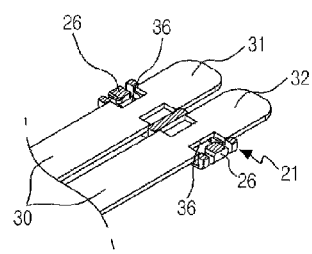
FIG. 14 is a top cross sectional view obtained by cutting horizontally a height direction central portion of the guide spring in the width direction of the flat wiper blade, under the state where the wiper strip, the fixing guide clip and the guide spring of FIG. 2 have been coupled to each other.
Figure 15:
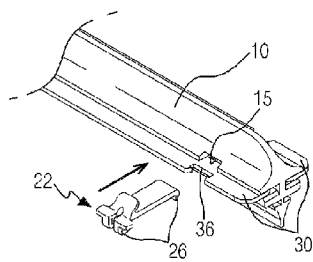
FIG. 15 is a partial perspective view showing a process in which the fastening guide clip of FIG. 2 passes through and is fitted to a guide clip hole of the wiper strip.
Figure 16:
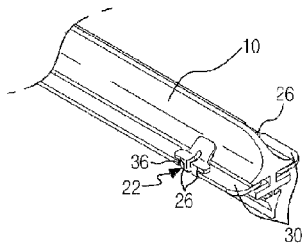
FIG. 16 is a partial perspective view showing a state where the wiper strip, the guide spring and the fastening guide clip of FIG. 2 have been coupled to each other.
Figure 19:
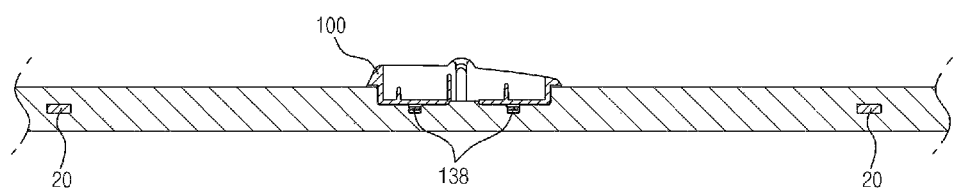
FIG. 19 is a cross sectional view obtained by vertically cutting a width direction central portion of the flat wiper blade in the longitudinal direction of the flat wiper blade, under the state where the wiper strip, the guide clip, the seating part and the guide spring of FIG. 2 have been coupled to each other.

FIG. 14 is a top cross sectional view obtained by cutting horizontally a height direction central portion of the guide spring in the width direction of the flat wiper blade, under the state where the wiper strip, the fixing guide clip and the guide spring of FIG. 13 have been coupled to each other. FIG. 15 is a partial perspective view showing a process in which the fastening guide clip of FIG. 2 passes through and is fitted to a guide clip hole of the wiper strip. FIG. 16 is a partial perspective view showing a state where the wiper strip, the guide spring and the fastening guide clip of FIG. 2 have been coupled to each other. FIG. 18*a* is a front cross sectional view taken along line A-A' shown in FIG. 17. FIG. 18*b* is a front cross sectional view taken along line B-B' shown in FIG. 17. FIG. 18*c* is a front cross sectional view taken along line C-C' shown in FIG. 17. FIG. 19 is a cross sectional view obtained by vertically cutting a width direction central portion of the flat wiper blade in the longitudinal direction of the flat wiper blade, under the state where the wiper strip, the guide clip, the seating part and the guide spring of FIG. 2 have been coupled to each other.

Referring to FIGS. 2, 10 and 11, the guide clip 20 and the fixing guide clip 21 pass through and are fitted to the guide clip hole 15 of the wiper strip 10 respectively. When the guide clip 20 and the fixing guide clip 21 are fitted to the guide clip hole 15, the catching portions 29 of the guide clip 20 and the fixing guide clip 21 and/or a contact area with the guide clip hole 15 are elastically transformed, so that the guide clip 20 and the fixing guide clip 21 pass through and are fitted to the guide clip hole 15, and then the catching portion 29 and/or the contact area with the guide clip hole 15 are restored to the original state by elasticity. As a result, the end of the catching portion 29 may be caught by the catching surface 19 of the wiper strip 10.

Here, although it has been described that the end of the catching portion 29 is elastically caught by the catching surface 19 of the wiper strip 10, the present invention is not necessarily limited to this. The end of the catching portion 29 may be caught by the catching surface 19 of the wiper strip 10 through a separate process.

Therefore, relative positions in the width direction of the wiper strip 10 of the guide clip 20 and the fixing guide clip 21 which pass through and are fitted to the guide clip hole 15 are fixed.

Also, referring to FIGS. 10 and 12, after the guide clip 20 and the fixing guide clip 21 pass through and are fitted to a plurality of the guide clip holes 15 respectively, the bridge 138 of the seating part 100 is inserted into the seating part bridge receiving recess 18 of the wiper strip 10.

However, in the embodiment, it is not necessarily required to sequentially perform the step in which the guide clip 20 and the fixing guide clip 21 pass through and are fitted to a plurality of the guide clip hole 15 respectively and the step in which the bridge 138 of the seating part 100 is inserted into the seating part bridge receiving recess 18 of the wiper strip 10. It can be considered that the two steps may be performed in reverse order.

Next, referring to FIGS. 3, 8, 9, 11, 12, 13, 18c and 19, the guide clip 20 and the fixing guide clip 21 pass through and are fitted to a plurality of the guide clip hole 15 respectively, and the bridge 138 of the seating part 100 is inserted into the seating part bridge receiving recess 18 of the wiper strip 10. Then, through one end of the wiper strip 10, in which the receiving recess 14 is formed to be open, the guide spring 30 which may be comprised of a first guide spring 31 and a second guide spring 32 passes through the receiving recess 14 of the wiper strip 10 and the guide spring coupling holes 24 of the guide clip 20 and the fixing guide clip 21 and passes through between the inner surface 150 of the seating part 100 and the top surface of the bridge 138, and is fitted to both sides of the width direction central portion of the wiper strip 10. Therefore, the guide clip 20 couples the wiper strip 10 to the guide spring 30. Also, due to the wiper strip 10 fitted between the inner surface 150 of the seating part 100 and the top surface of the bridge 138 and fitted to the receiving recess 14 of the wiper strip 10, the seating part 100, the wiper strip 10 and the guide spring 30 are prevented from being vertically separated from each other.

Referring to FIGS. 7b, 11b and 14, the guide spring coupling protrusion 26 of the fixing guide clip 21 is elastically transformed to the outside of the fixing guide clip 21, and then the guide spring 30 passes through and is fitted to the guide spring coupling hole 24. Then, the guide spring coupling protrusion 26 is restored to the original state by elasticity, so that the guide spring 30 can be fitted to the guide clip coupling recess 36.

Therefore, referring to FIGS. 4 and 14, due to the other end of the wiper strip 10, in which the receiving recess 14 is formed to be closed, and the guide spring coupling protrusion 26 of the fixing guide clip 21 coupled to the guide clip hole 15 of the wiper strip 10, the guide spring 30 is prevented from further moving in the fitting direction. Due to the guide spring coupling protrusion 26 of the fixing guide clip 21 coupled to the guide clip hole 15 of the wiper strip 10, the guide spring 30 is also prevented from moving in an opposite direction to the fitting direction.

Next, referring to FIGS. 7c, 15, 16 and 18d, the guide clip 20 and the fixing guide clip 21 pass through and are fitted to a plurality of the guide clip hole 15 respectively, and the bridge 138 of the seating part 100 is inserted into the seating part bridge receiving recess 18 of the wiper strip 10. Subsequently, through one end of the wiper strip 10, in which the receiving recess 14 is formed to be open, the guide spring 30 passes through the receiving recess 14 of the wiper strip 10 and the guide spring coupling holes 24 of the guide clip 20 and the fixing guide clip 21 and passes through between the inner surface 150 of the seating part 100 and the top surface of the bridge 138, and is fitted to both sides of the width direction central portion of the wiper strip 10. Then, the fastening guide clip 22 passes through and is fitted to the guide clip hole 15.

As the guide spring coupling protrusion 26 of the fastening guide clip 22 is inserted between the top surface of the guide spring 30 and the top surface of the guide clip hole 15, the guide spring coupling protrusion 26 of the fastening guide clip 22 and/or the top surface of the guide clip hole 15 are elastically transformed, so that the fastening guide clip 22 passes through and is fitted to the guide clip hole 15. Then, the guide spring coupling protrusion 26 and and/or the top surface of the guide clip hole 15 are restored to the original state by elasticity. As a result, the end of the guide spring coupling protrusion 26 may be caught by the guide clip coupling recess 36 of the guide spring 30.

Therefore, due to the guide spring coupling protrusion 26 of the fastening guide clip 22 coupled to the guide clip hole 15 of the wiper strip 10, the guide spring 30 is prevented from moving in the fitting direction and is additionally prevented from moving in an opposite direction to the fitting direction.

In the step in which the guide spring 30 is fastened to the fixing guide clip 21 and the step in which the fastening guide clip 22 passes through and is fitted to the guide clip hole 15, although it has been described that the end of the guide spring coupling protrusion 26 of the fixing guide clip 21 and the end of the guide spring coupling protrusion 26 of the fastening guide clip 22 are elastically caught by the guide clip coupling recess 36 of the guide spring 30, the present invention is not necessarily limited to this. The end of the guide spring coupling protrusion 26 may be caught by the guide clip coupling recess 36 of the guide spring 30.

Meanwhile, although it has been described that both the fixing guide clip 21 and the fastening guide clip 22 have been used to prevent the longitudinal movement of the guide spring 30, the present invention is not necessarily limited to this. It is possible to configure such that only one of the fixing guide clip 21 and the fastening guide clip 22 may be used.

Also, it is not necessarily to use the guide spring coupling protrusions 26 of the fixing guide clip 21 and/or the fastening guide clip 22 and the guide clip coupling recess 36 of the guide spring 30 in order to prevent the guide spring 30 from moving in the fitting direction and in an opposite direction to the fitting direction. Therefore, it is possible to configure such that a separately formed end cap is coupled to both longitudinal ends of the guide spring 30 and the wiper strip 10 by publicly known arts, so that guide spring 30 is prevented from moving in the fitting direction and in an opposite direction to the fitting direction.

As such, referring to FIGS. 1 to 19, in the flat wiper blade 2 of the present invention, the spoiler integrated wiper strip is coupled to the guide spring by using a plurality of the guide clips instead of a yoke, thereby minimizing the number of the parts required for manufacturing the flat wiper blade and reducing the overall height of the flat wiper blade.

Additionally, the coupling method of the flat wiper blade 2 of the present invention also includes as follows the guide clip 20 and the fixing guide clip 21 pass through and are fitted to the guide clip hole 15 of the wiper strip 10 respectively, and the guide spring 30 is fitted to the receiving recess 14 of the wiper strip 10 and the guide spring coupling holes 24 of the guide clip 20 and the fixing guide clip 21.

Subsequently, after the fastening guide clip 22 is fitted to the guide clip hole 15, the seating part 100 is coupled to the wiper strip 10 and/or the guide spring 30. Hereafter, this coupling method of the flat wiper blade 2 will be sequentially described.

Figure 20:
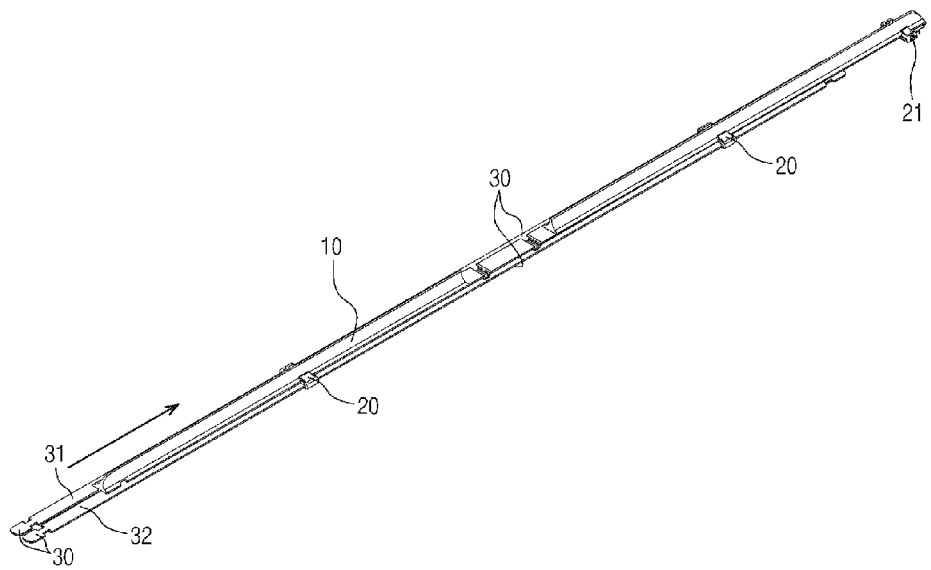
FIG. 20 is a perspective view showing a process in which the guide spring passes through and is fitted to the receiving recess of the wiper strip, and the guide spring coupling holes of the guide clip and the fixing guide clip, under the state where the wiper strip, the guide clip and the fixing guide clip of FIG. 2 have been coupled to each other.
Figure 21:
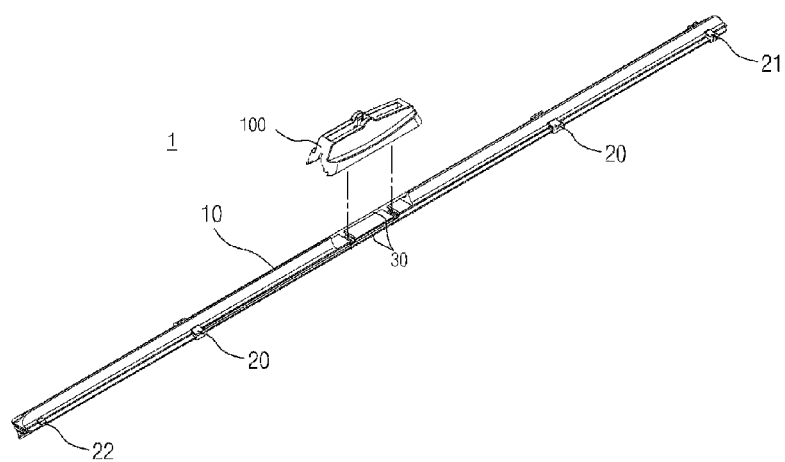
FIG. 21 is a perspective view showing a process in which the seating part is coupled, under the state where the wiper strip, the guide clip, the fixing guide clip, the guide spring and the fastening guide clip of FIG. 2 have been coupled to each other.

FIG. 20 is a perspective view showing a process in which the guide spring passes through and is fitted to the receiving recess of the wiper strip, and the guide spring coupling holes of the guide clip and the fixing guide clip, under the state where the wiper strip, the guide clip and the fixing guide clip of FIG. 2 have been coupled to each other. FIG. 21 is a perspective view showing a process in which the seating part is coupled, under the state where the wiper strip, the guide clip, the fixing guide clip, the guide spring and the fastening guide clip of FIG. 2 have been coupled to each other.

Referring to FIGS. 2, 10 and 11, the guide clip 20 and the fixing guide clip 21 pass through and are fitted to the guide clip hole 15 of the wiper strip 10 respectively. When the guide clip 20 and the fixing guide clip 21 are fitted to the guide clip hole 15, the catching portions 29 of the guide clip 20 and the fixing guide clip 21 and/or a contact area with the guide clip hole 15 are elastically transformed, so that the guide clip 20 and the fixing guide clip 21 pass through and are fitted to the guide clip hole 15, and then the catching portion 29 and/or the contact area with the guide clip hole 15 are restored to the original state by elasticity. As a result, the end of the catching portion 29 may be caught by the catching surface 19 of the wiper strip 10.

Here, although it has been described that the end of the catching portion 29 is elastically caught by the catching surface 19 of the wiper strip 10, the present invention is not necessarily limited to this. The end of the catching portion 29 may be caught by the catching surface 19 of the wiper strip 10 through a separate process.

Therefore, relative positions in the width direction of the wiper strip 10 of the guide clip 20 and the fixing guide clip 21 which pass through and are fitted to the guide clip hole 15 are fixed.

Next, referring to FIGS. 3, 9, 11 and 20, the guide clip 20 and the fixing guide clip 21 pass through and are fitted to a plurality of the guide clip holes 15 respectively, and then through one end of the wiper strip 10, in which the receiving recess 14 is formed to be open, the guide spring 30 which may be comprised of the first guide spring 31 and the second guide spring 32 passes through the receiving recess 14 of the wiper strip 10 and the guide spring coupling holes 24 of the guide clip 20 and the fixing guide clip 21 and is fitted to both sides of the width direction central portion of the wiper strip 10. Therefore, the guide clip 20 couples the wiper strip 10 to the guide spring 30.

Referring to FIGS. 7b, 11b and 14, the guide spring coupling protrusion 26 of the fixing guide clip 21 is elastically transformed to the outside of the fixing guide clip 21, and then the guide spring 30 passes through and is fitted to the guide spring coupling hole 24. Then, the guide spring coupling protrusion 26 is restored to the original state by elasticity, so that the guide spring 30 can be fitted to the guide clip coupling recess 36.

Therefore, referring to FIGS. 4 and 14, due to the other end of the wiper strip 10, in which the receiving recess 14 is formed to be closed, and the guide spring coupling protrusion 26 of the fixing guide clip 21 coupled to the guide clip hole 15 of the wiper strip 10, the guide spring 30 is prevented from further moving in the fitting direction. Due to the guide spring coupling protrusion 26 of the fixing guide clip 21 coupled to the guide clip hole 15 of the wiper strip 10, the guide spring 30 is also prevented from moving in an opposite direction to the fitting direction.

Next, referring to FIGS. 7c, 15, 16 and 18d, the guide clip 20 and the fixing guide clip 21 pass through and are fitted to a plurality of the guide clip hole 15 respectively. Subsequently, through one end of the wiper strip 10, in which the receiving recess 14 is formed to be open, the guide spring 30 passes through the receiving recess 14 of the wiper strip 10 and the guide spring coupling holes 24 of the guide clip 20 and the fixing guide clip 21, and is fitted to both sides of the width direction central portion of the wiper strip 10. Then, the fastening guide clip 22 passes through and is fitted to the guide clip hole 15.

As the guide spring coupling protrusion 26 of the fastening guide clip 22 is inserted between the top surface of the guide spring 30 and the top surface of the guide clip hole 15, the guide spring coupling protrusion 26 of the fastening guide clip 22 and/or the top surface of the guide clip hole 15 are elastically transformed, so that the fastening guide clip 22 passes through and is fitted to the guide clip hole 15. Then, the guide spring coupling protrusion 26 and and/or the top surface of the guide clip hole 15 are restored to the original state by elasticity. As a result, the end of the guide spring coupling protrusion 26 may be caught by the guide clip coupling recess 36 of the guide spring 30.

Therefore, due to the guide spring coupling protrusion 26 of the fastening guide clip 22 coupled to the guide clip hole 15 of the wiper strip 10, the guide spring 30 is prevented from moving in the fitting direction and is additionally prevented from moving in an opposite direction to the fitting direction.

In the step in which the guide spring 30 is fastened to the fixing guide clip 21 and the step in which the fastening guide clip 22 passes through and is fitted to the guide clip hole 15, although it has been described that the end of the guide spring coupling protrusion 26 of the fixing guide clip 21 and the end of the guide spring coupling protrusion 26 of the fastening guide clip 22 are elastically caught by the guide clip coupling recess 36 of the guide spring 30, the present invention is not necessarily limited to this. The end of the guide spring coupling protrusion 26 may be caught by the guide clip coupling recess 36 of the guide spring 30.

Meanwhile, although it has been described that both the fixing guide clip 21 and the fastening guide clip 22 have been used to prevent the longitudinal movement of the guide spring 30, the present invention is not necessarily limited to this. It is possible to configure such that only one of the fixing guide clip 21 and the fastening guide clip 22 may be used.

Also, it is not necessarily to use the guide spring coupling protrusions 26 of the fixing guide clip 21 and/or the fastening guide clip 22 and the guide clip coupling recess 36 of the guide spring 30 in order to prevent the guide spring 30 from moving in the fitting direction and in an opposite direction to the fitting direction. Therefore, it is possible to configure such that a separately formed end cap is coupled to both longitudinal ends of the guide spring 30 and the wiper strip 10 by publicly known arts, so that guide spring 30 is prevented from moving in the fitting direction and in an opposite direction to the fitting direction.

Next, referring to FIG. 21, the seating part 100 is coupled to the wiper strip 10 and/or the guide spring 30. Here, there is no limit to the method of coupling the seating part 100 to the wiper strip 10 and/or the guide spring 30. It can be considered that the seating part 100 may be coupled to the wiper strip 10 and/or the guide spring 30 by publicly known arts.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. That is, the components described in detail in the embodiments of the present invention may be modified. Further, differences due to the modification and application should be construed as being included in the scope and spirit of the present invention, which is described in the accompanying claims.

What is claimed is:

1. A flat wiper blade comprising:
   a wiper strip which wipes a wiping surface and comprises a plurality of guide clip holes which are formed to pass through a receiving recess in a width direction of the wiper strip;
   at least one guide clip which passes through and is fitted to at least one of the plurality of guide clip holes respectively;
   a fixing guide clip or a fastening guide clip which passes through and is fitted to others of the plurality of guide clip holes; and
   a guide spring which is coupled to the wiper strip and the guide clip and supports the wiper strip,
   wherein the guide spring comprises a guide clip coupling recess to which the fixing guide clip or the fastening guide clip is coupled.

2. The flat wiper blade of claim 1,
   wherein the wiper strip comprises a base and a wiping lip which is disposed under the base,
   wherein the base comprises the receiving recesses which are formed on both sides of a width direction central portion of the base and extend parallel to each other in a longitudinal direction of the base, and
   wherein the guide spring is fitted to the receiving recess.

3. The flat wiper blade of claim 2,
   wherein the plurality of guide clip holes is formed to pass through the receiving recess in the width direction of the wiper strip.

4. The flat wiper blade of claim 2, wherein the guide spring comprises a first guide spring and a second guide spring.

5. The flat wiper blade of claim 1, wherein a spoiler is integrally formed with the wiper strip on both longitudinal ends of the wiper strip.

6. The flat wiper blade of claim 5,
   wherein an upper surface of the guide clip hole is located higher than an upper surface of the receiving recess and is located lower than a top surface of the spoiler,
   wherein a lower surface of the guide clip hole is located higher than a lower surface of a base, and
   wherein a height direction gap of the guide clip hole is larger than that of the receiving recess and is smaller than that of the base.

7. The flat wiper blade of claim 1, wherein the fixing guide clip or the fastening guide clip comprises at least one pair of guide spring coupling protrusions formed at both ends thereof, and wherein the guide spring coupling protrusion is caught by the guide clip coupling recess.

8. The flat wiper blade of claim 7, wherein the guide spring coupling protrusion is elastically caught by the guide clip coupling recess.

9. The flat wiper blade of claim 1,
   wherein the guide clip comprises guide spring coupling holes which are formed at both sides of a central portion of the guide clip in the width direction of the wiper strip in a state where the guide clip has been coupled to the wiper strip and which extend parallel to each other in a longitudinal direction of the wiper strip, and
   wherein the guide spring passes through and is fitted to the guide spring coupling hole of the guide clip.

10. The flat wiper blade of claim 1, wherein the guide clip further comprises a catching portion of which an end is caught by a catching surface of the wiper strip.

11. The flat wiper blade of claim 1, wherein the fixing guide clip or the fastening guide clip further comprises a catching portion of which an end is caught by a catching surface of the wiper strip.

12. The flat wiper blade of claim 1, further comprises a seating part which is coupled to the wiper strip in an attachable and removable manner, and wherein the guide spring is coupled to the seating part.

13. The flat wiper blade of claim 12,
   wherein the seating part comprises an inner surface and at least one bridge which connects both sides of a bottom surface of the seating part through a central portion thereof,
   wherein the wiper strip further comprises at least one seating part bridge receiving recess which is formed on a top surface of a longitudinal central portion of the wiper strip,
   wherein the bridge is inserted into the seating part bridge receiving recess, and
   wherein the guide spring is fitted by passing through between the inner surface of the seating part and a top surface of the bridge.

* * * * *